(12) United States Patent
Rahn et al.

(10) Patent No.: US 7,845,270 B2
(45) Date of Patent: Dec. 7, 2010

(54) APPARATUS, SYSTEM AND METHOD FOR RETAINING BEVERAGE BREWING SUBSTANCE

(75) Inventors: Christopher W. Rahn, Virden, IL (US); William Thomas, Pawnee, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1005 days.

(21) Appl. No.: 11/056,593

(22) Filed: Feb. 7, 2005

(65) Prior Publication Data

US 2005/0193892 A1 Sep. 8, 2005

Related U.S. Application Data

(60) Provisional application No. 60/542,433, filed on Feb. 6, 2004.

(51) Int. Cl.
*A47J 31/06* (2006.01)
*A47J 31/40* (2006.01)

(52) U.S. Cl. ............ 99/289 R; 99/295; 99/302 R; 99/323; 426/433

(58) Field of Classification Search ............ 99/295, 99/302 R, 307, 306, 304, 289 R, 323, 280; 426/433
See application file for complete search history.

(56) References Cited

U.S. PATENT DOCUMENTS

| | | | |
|---|---|---|---|
| 3,413,907 A | 12/1968 | Schwertfeger et al. | |
| 3,413,909 A | 12/1968 | Heier | |
| 3,478,670 A | 11/1969 | Fuqua | |
| 3,478,673 A | 11/1969 | Burney | |
| 3,620,155 A | 11/1971 | Bixby | |
| 3,793,935 A * | 2/1974 | Martin | ........... 99/295 |
| 3,878,772 A | 4/1975 | Nordskog | |

(Continued)

FOREIGN PATENT DOCUMENTS

FR 2745995 9/1997

(Continued)

OTHER PUBLICATIONS

International Search Report and Written Opinion for International U.S. Appl. No. PCT/US2005/003830, International Filing Date Jul. 2, 2005. ISR and Written competion date May 23, 2005, Date of Mailing Jun. 1, 2005.

*Primary Examiner*—Reginald L Alexander
(74) *Attorney, Agent, or Firm*—Barnes & Thornburg LLP

(57) ABSTRACT

Disclosed is a beverage brewer for brewing a beverage using a beverage brewing substance pod. The pod may include substances such as coffee for producing a desired brewed beverage. A pod holder, having at least one wall, defining a cavity in the pod holder for retaining the pod for brewing. Water is dispensed into the pod and drained through a drain in the pod holder. The pod holder is removable from the brewer for placing a pod therein. The pod holder is slideably inserted into the brewer for brewing. One or more ramps are provided on the brewer for engagement with corresponding ramps on the pod holder for positioning the holder relative to the sprayhead for infusing the pod retained in the holder. Water is introduced to the pod without piercing the pod. Legs are provided on a portion of the pod holder for positioning the pod holder in an upright position when removed from the brewer.

25 Claims, 9 Drawing Sheets

U.S. PATENT DOCUMENTS

| | | |
|---|---|---|
| 3,948,157 A | 4/1976 | Layre |
| 4,303,525 A * | 12/1981 | Stover ........................ 210/455 |
| 4,429,623 A | 2/1984 | Illy |
| 4,565,121 A * | 1/1986 | Ohya et al. .................... 99/281 |
| 4,642,190 A * | 2/1987 | Zimmerman ................ 210/464 |
| 4,660,466 A * | 4/1987 | Fries et al. .................... 99/294 |
| 4,697,503 A | 10/1987 | Okabe et al. |
| 5,008,013 A | 4/1991 | Favre et al. |
| 5,083,504 A | 1/1992 | Koga |
| 5,111,740 A | 5/1992 | Klein |
| 5,197,374 A | 3/1993 | Fond |
| 5,287,797 A | 2/1994 | Grykiewicz et al. |
| 5,312,637 A | 5/1994 | Midden |
| 5,335,589 A * | 8/1994 | Yerves et al. ................. 99/295 |
| 5,347,916 A | 9/1994 | Fond |
| 5,392,694 A | 2/1995 | Muller |
| 5,402,707 A * | 4/1995 | Fond et al. .................... 99/295 |
| 5,463,933 A * | 11/1995 | Landais ........................ 99/285 |
| 5,495,793 A | 3/1996 | Muis |
| 5,531,152 A | 7/1996 | Gardosi |
| 5,566,605 A * | 10/1996 | Lebrun et al. ............. 99/302 C |
| 5,638,741 A | 6/1997 | Cisaria |
| 5,649,472 A | 7/1997 | Fond |
| 5,794,519 A | 8/1998 | Fischer |
| 5,875,704 A * | 3/1999 | Levi et al. ..................... 99/295 |
| 5,974,950 A | 11/1999 | King |
| 5,992,298 A | 11/1999 | Illy |
| 6,021,705 A | 2/2000 | Dijs |
| 6,026,993 A | 2/2000 | Sperna Weiland |
| 6,062,127 A | 5/2000 | Klosinski |
| 6,117,471 A | 9/2000 | King |
| 6,119,582 A | 9/2000 | Akkerman-Theunisse |
| 6,186,051 B1 | 2/2001 | Aarts |
| 6,345,570 B1 | 2/2002 | Santi |
| 6,488,976 B1 | 12/2002 | Priley |
| 6,584,888 B2 | 7/2003 | Cortese |
| 6,606,938 B2 | 8/2003 | Taylor |
| 6,607,762 B2 | 8/2003 | Lazaris |
| 6,655,260 B2 | 12/2003 | Lazaris |
| 6,658,989 B2 | 12/2003 | Sweeney |
| 6,672,200 B2 * | 1/2004 | Duffy et al. ................... 99/283 |
| 6,799,504 B2 | 10/2004 | Brouwer |
| 6,904,840 B1 * | 6/2005 | Pfeifer et al. ................. 99/295 |
| 7,032,503 B2 * | 4/2006 | Cai .............................. 99/286 |
| 2001/0000570 A1 | 5/2001 | Aarts |
| 2002/0129712 A1 | 9/2002 | Westbrook |
| 2003/0072859 A1 | 4/2003 | Priley |
| 2003/0089245 A1 | 5/2003 | Kollep |
| 2004/0231523 A1 | 11/2004 | Kraan |
| 2005/0103202 A1 * | 5/2005 | Rahn et al. .................... 99/279 |

FOREIGN PATENT DOCUMENTS

| | | |
|---|---|---|
| FR | 2745987 | 4/1999 |
| WO | WO 02/38016 | 5/2002 |
| WO | WO 03/030696 | 4/2003 |

* cited by examiner

APPARATUS, SYSTEM AND METHOD FOR RETAINING BEVERAGE BREWING SUBSTANCE

CROSS REFERENCE

This application claims the benefit of U.S. provisional application Ser. No. 60/542,433, filed Feb. 6, 2004.

BACKGROUND

A variety of brewing apparatus have been developed to combine heated water with a brewing substance such as ground coffee or tea material in order to infuse the material and produce a brewed beverage. There are many ways to combine the water with the brewing substance. One way is to place the substance in a filter device such as a disposable filter paper and place the filter paper and brewing substance in a brewing funnel or basket. Water is mixed with the brewing substance in the filter thereby allowing the brewed substance to filter through the paper leaving the saturated brewing substance in the filter paper. The saturated substance and used filter paper can be thrown away.

Another way of brewing beverage is to encapsulate the brewing substance in a filter material. The brewing substance in the filter material provides a convenient package for handling a predetermined quantity of brewing substance. The filter material provides a package or container for the brewing substance. This package allows the brewing substance to be handled prior to brewing and after brewing without complication or mess.

Such brewing substances pre-packaged in filter material are referred to as "pods" or "sachets." Pods can be compressed during packaging in the filter material or left in a generally loose condition. Pods generally have a circular shape with a generally flattened configuration often appearing as a disc or puck. Pods generally range in a size from approximately 45-60 mm and contain approximately 9-10 grams of brewing substance. A typical pod may produce approximately 8 ounces of brewed beverage.

BRIEF DESCRIPTION OF THE DRAWINGS

The organization and manner of the structure and function of the invention, together with the further objects and advantages thereof, may be understood by reference to the following description taken in connection with the accompanying drawings, and in which.

DETAILED DESCRIPTION

Figure 1:
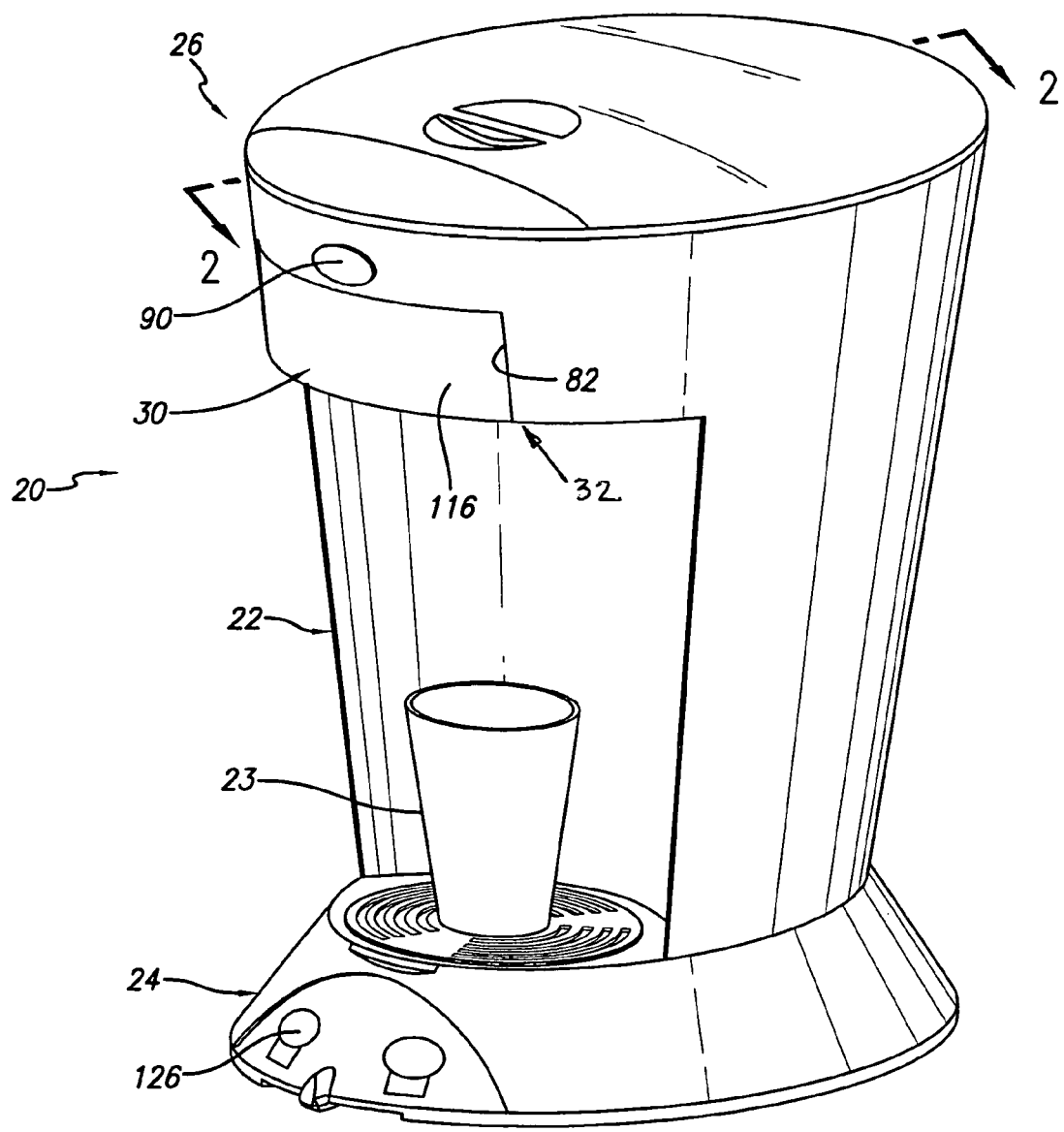
FIG. 1 is a perspective view of an embodiment of a brewer for producing a brewed beverage.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

As shown in FIG. 1, a brewer 20 includes a body 22, a base 24 and an upper portion 26. The upper portion 26 is configured to be positioned above a container such as a cup 28 for dispensing beverage into the cup 28. It should be noted that many different configurations of the brewer 20 can be developed to achieve the structure and function of the apparatus, system and method as described in this disclosure. For example, the body 22, base 24 and upper portion 26 could be configured in different shapes and different dimensions while still positioning the upper portion 26 relative to a cup to dispense beverage into the cup 28.

Terms including beverage, beverage making and brewing as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

While a "pod" is described herein, it is envisioned that any form of beverage brewing substance device, holder, filter structure or other substance delivery media or vehicle may be used. The present disclosure will also include us of the structures and functions with loose brewing substance such as might be used in a loose substance holder. It is envisioned that the present apparatus, system and method of operation could be utilized with other concentrates such as freeze dried concentrates, gel, liquid, powder or any other form of concentrate which will operate with the disclosed apparatus, system and method as well as equivalents thereof and any modifications which might be required to modify the apparatus, system and method to be used with such other substances, if necessary.

Some portions or structures of the brewer 20 may not have been illustrated in detail in the drawings in the interest of clarity in this disclosure. For example, even though the brewer includes a water delivery system 29 including a water reservoir and water dispensing components, these structures are not explicitly illustrated herein subject to incorporation by reference from other related applications noted herein. The water reservoir and water dispensing components are shown diagrammatically as component 45 coupled to a sprayhead 40 for delivering water to the holder 30. A variety of configurations for delivering water to the holder 30 can be devised and will be appreciated to be included in the present disclosure. The specific embodiment, while not being shown, can include many forms such as a reservoir which provides water to a heating area, a pressurized line feeding water directly to a reservoir, a rapid heating device which receives water from an unheated reservoir or pressurized line as well as any other variety of configurations now available or hereafter designed in combination with the holder and other structures disclosed herein. The type of water delivery system 45 and other components delivering water to the sprayhead should not limit the scope of this disclosure and appended claims and should be given broad interpretation.

Further details of the configuration and operation of the single-serving brewer 20 can be found in related provisional applications entitled "Apparatus, System and Method for Infusing a Pre-Packaged Pod filed Feb. 9, 2004 U.S. Provisional Application No. 60/543,370, "Apparatus System and Method for Retaining Beverage Brewing Substance" filed Feb. 6, 2004 Provisional Application No. 60/542,433, and "Pod Brewer" filed Feb. 10, 2004, U.S. Design Application No. 29/199,168 (now Pat. No. D511922). Additional information related to a spray head system and method for delivering water to the brewing assembly of the single-serving brewer 20 can be found in U.S. Provisional Application entitled "Water Delivery System, Apparatus and Method" filed Nov. 7, 2003, U.S. Provisional Application No. 60/518,411 and U.S. patent application entitled "System, Method, and Apparatus for Heating Water" filed Nov. 8, 2004, U.S. Utility application Ser. No. 10/983,446, now U.S. Pat. No. 7,685,932. Additional information related to beverage making apparatus which uses loose coffee and related devices and methods of use can be found in U.S. Provisional Application entitled "[[A]] Beverage Making Apparatus and Method Using Loose Beverage Substance" filed Apr. 2, 2004, U.S. Provisional Application No. 60/560,033. Information about a pod holder with a removable insert can be found in U.S. Provisional Application entitled "Pod Holder with Removable Insert" filed May 28, 2004, U.S. Provisional Application No. 60/575,235. Information about a beverage making apparatus which uses loose coffee and related devices and methods of use can be found in U.S. Provisional Application entitled "Beverage Making Apparatus and Method Using Loose Beverage Substance" filed Sep. 1, 2004, U.S. Provisional Application No. 60/606,233. Each of the above-referenced applications and the materials set forth therein is incorporated herein by reference in its entirety.

Figure 2:
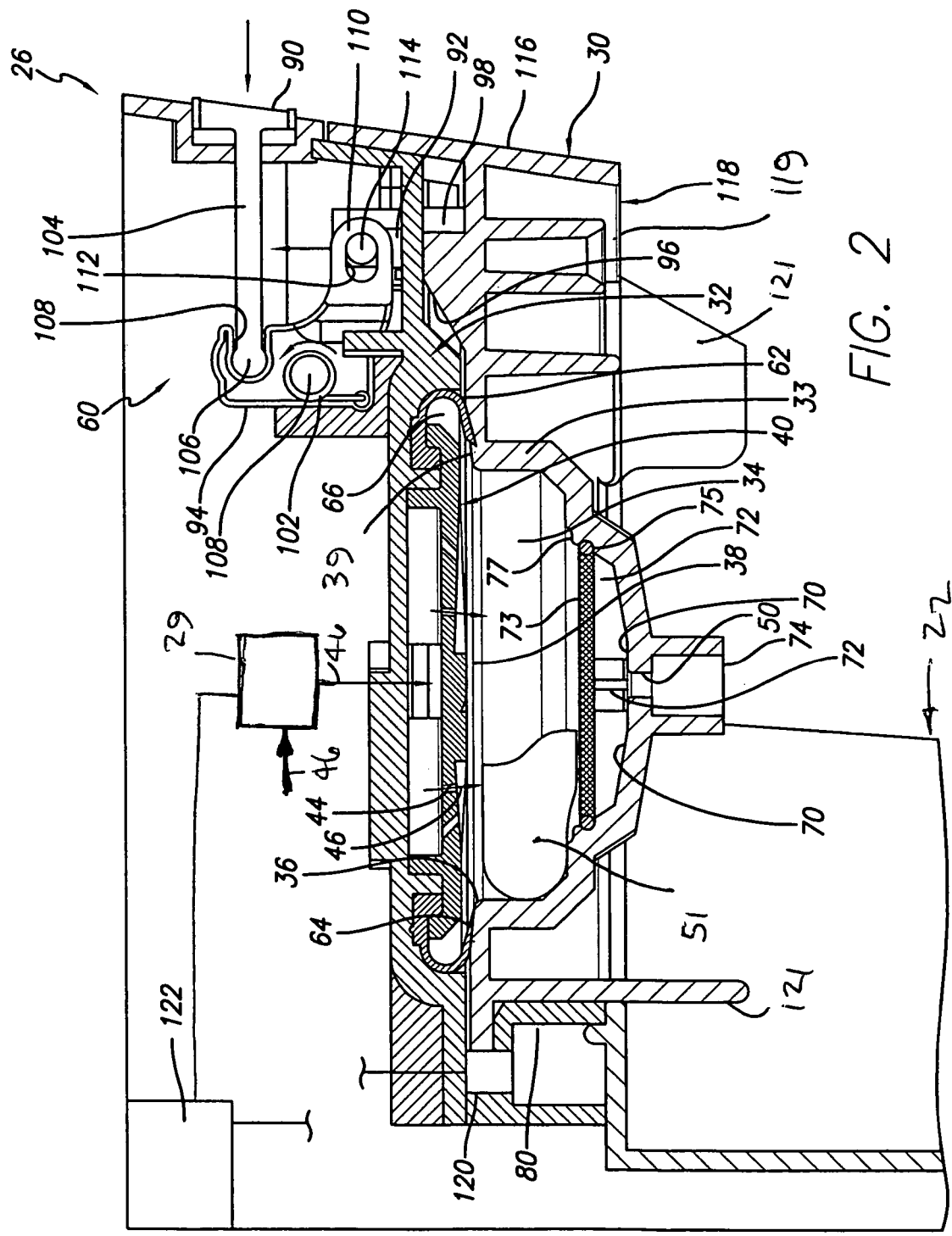
FIG. 2 is an enlarged partial fragmentary cross-sectional side elevational view taken along line 2-2 in FIG. 1.
Figure 4:
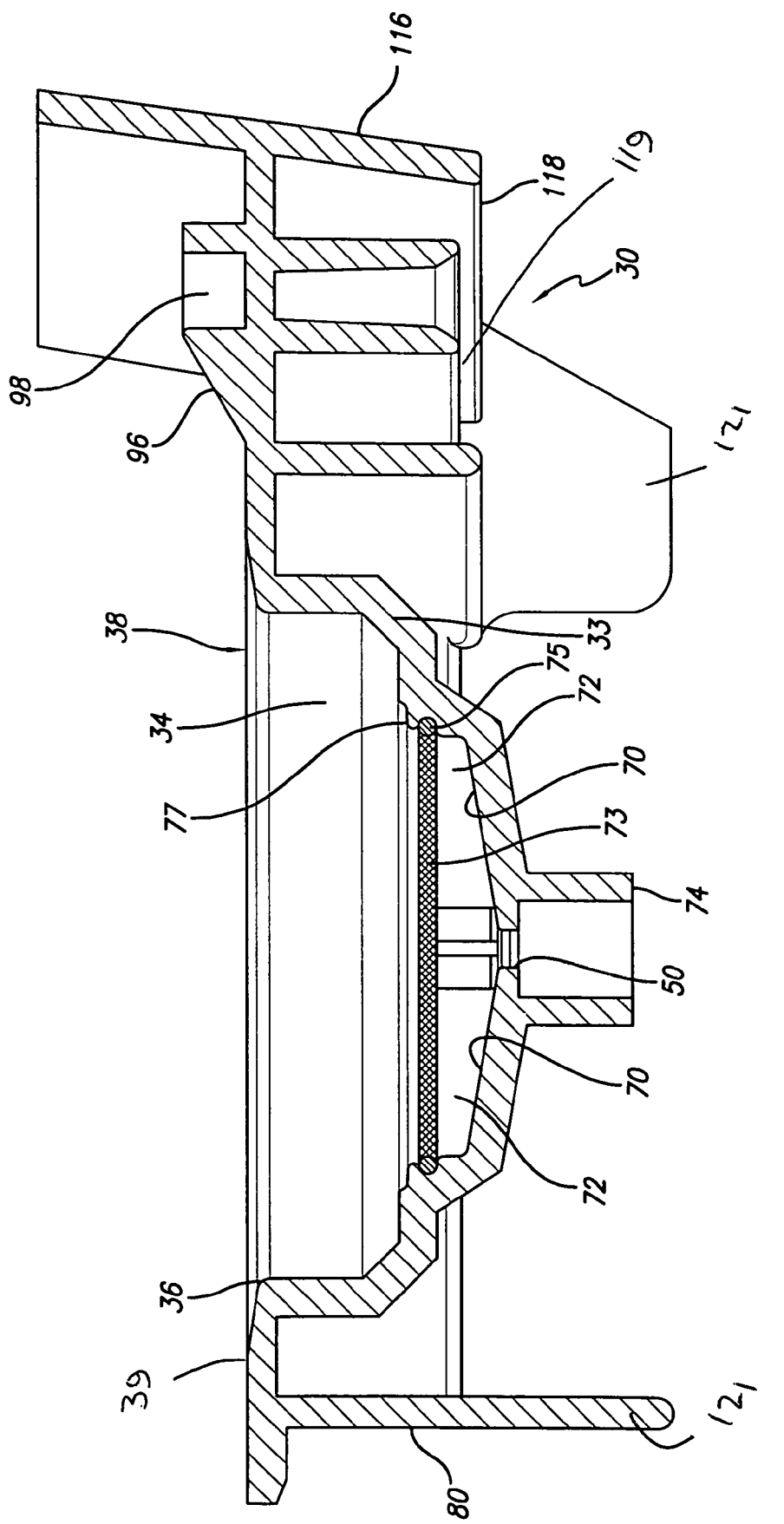
FIG. 4 is a view of the substance holder removed from the brewer.
Figure 5:
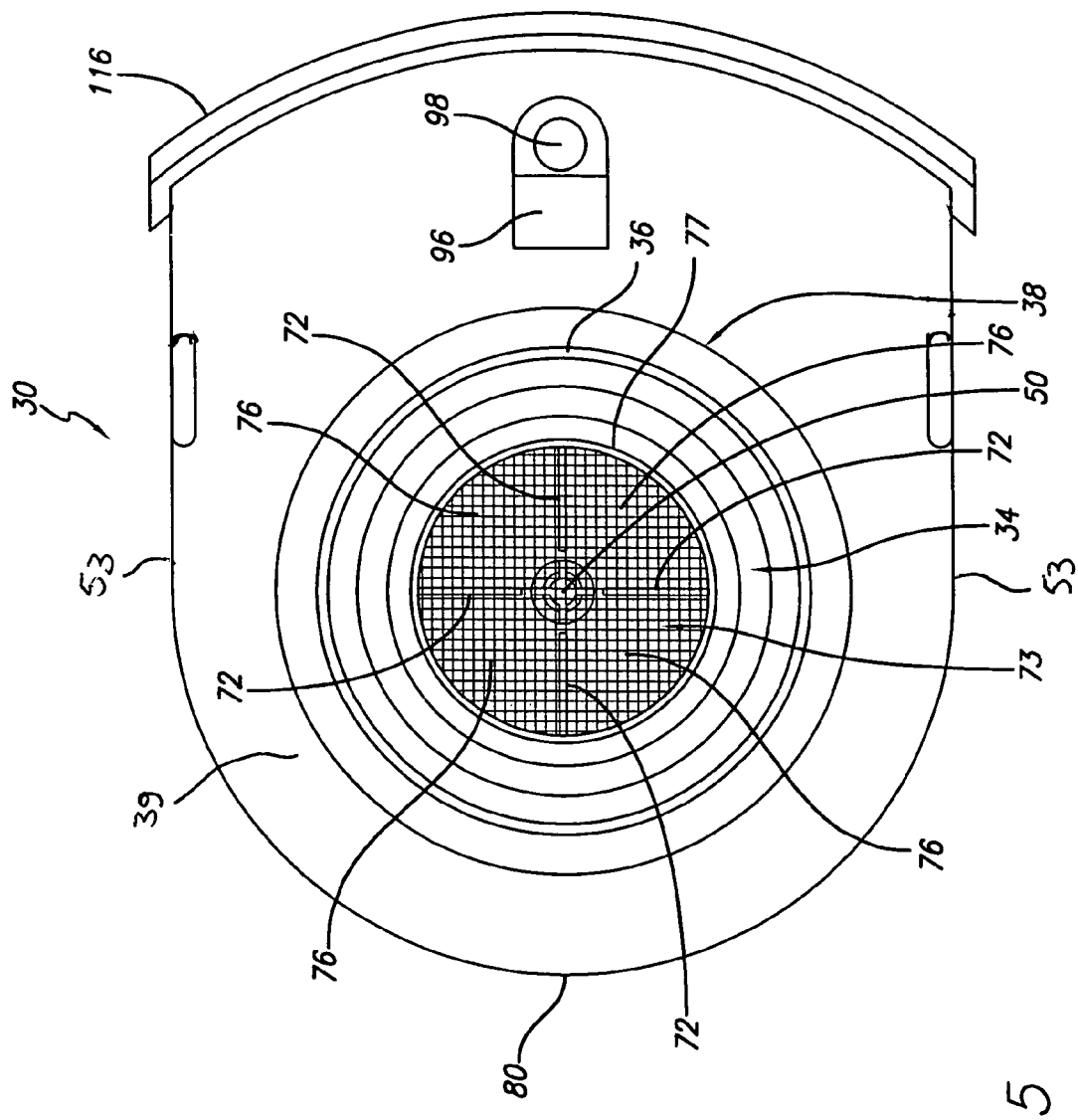
FIG. 5 is a top plan view of the substance holder.
Figure 6:
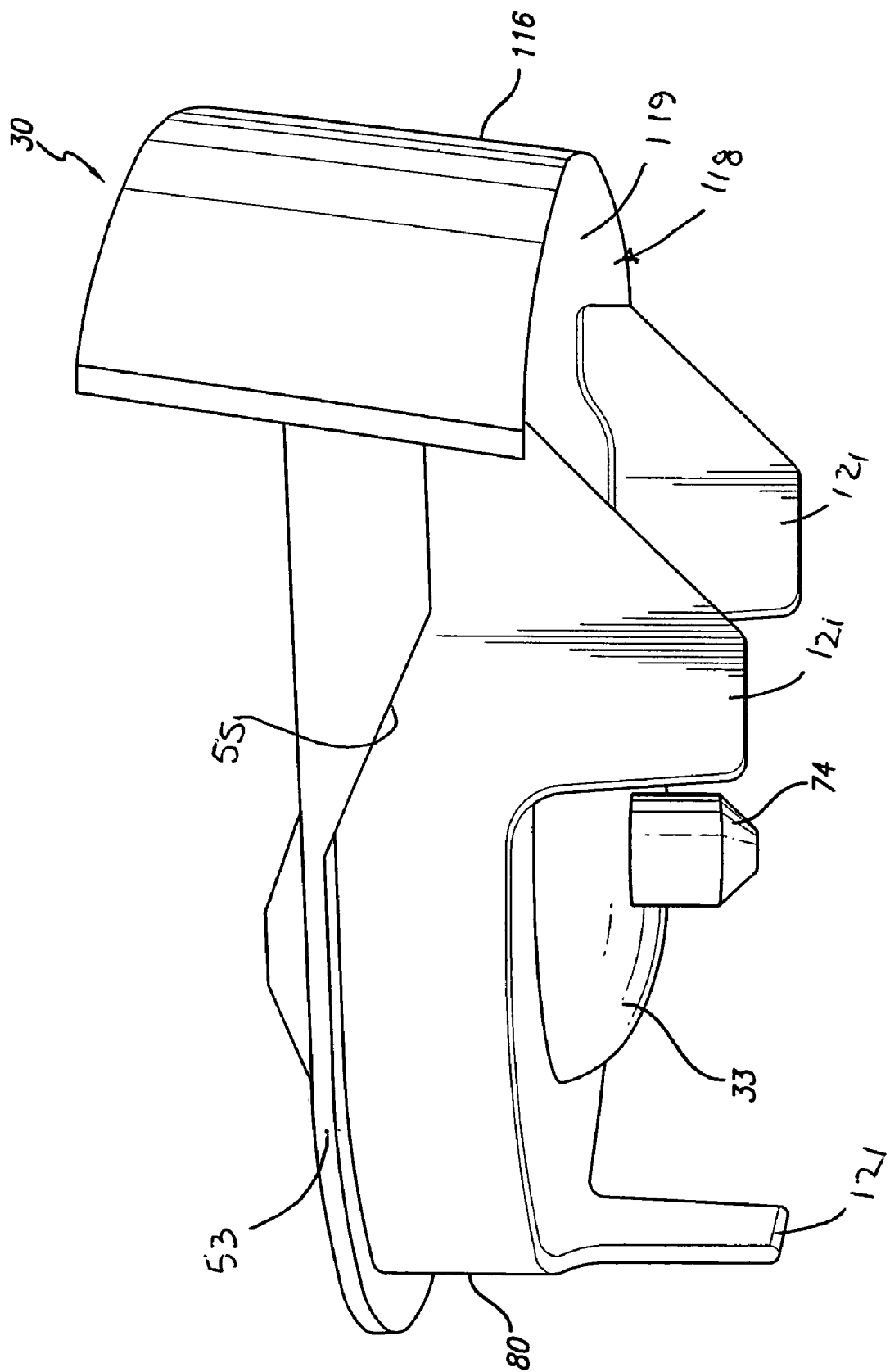
FIG. 6 is a perspective view of the substance holder as shown in the figures.

FIG. 2 shows an enlarged portion of the upper portion 26 taken along cross-sectional line 2-2 in FIG. 1. In FIG. 2, a substance holder 30 is shown attached to a mounting portion 32 of the upper portion 26. In the interest of simplicity and clarity the entirety of the cross section of the brewer is not shown and the emphasis is provided for the holder 30 and related structures. The holder 30 is also shown in FIGS. 4, 5 and 6 is a device acting as a drawer to retain brewing substance such as a pod 51 (shown in a fragmentary view to avoid obstructing other parts) in a predetermined position in the brewer 20 for brewing. The holder 30 includes a wall 33 which defines a cavity 34 therein. With further reference to FIGS. 4 and 5 the wall 33 defines an upper rim 36. The upper rim defines an entry opening 38 and corresponding flanges 53 extending outwardly away from the holder 30.

In the installed position as shown in FIG. 2 the holder 30 is positioned with the entry opening 38 in position to receive water for brewing. The structure of the entry opening 38 is symmetric such that corresponding retaining structures 57 are on both sides of the entry opening 38 for supporting the holder 38 by the flanges 53 thereof. The entry opening 38 and cavity 34 are positioned below a sprayhead 40. Water 46 is provided by a water delivery system 29 and enters a sprayhead area 42 defined by the sprayhead 40. Water in the sprayhead area 42 flows through the holes 44 through the entry opening and into the cavity 34. The water flows through the pod without the use of piercing structures as used in other brewers. The use of piercing structures in other brewers complicates the brewer and can result in added work cleaning the structures in addition to possibly tearing the pod and breaching containment of the spent brewing substance. Once the water has been dispensed into the area it mixes with the substance retained in the cavity 34 for producing a desired beverage. The beverage drains through a drain hole 50 for dispensing into the cup 28. It should be noted that a variety of sprayhead configurations or other structures and systems for delivering water to the cavity could be used with the disclosed brewer 20.

Figure 3:
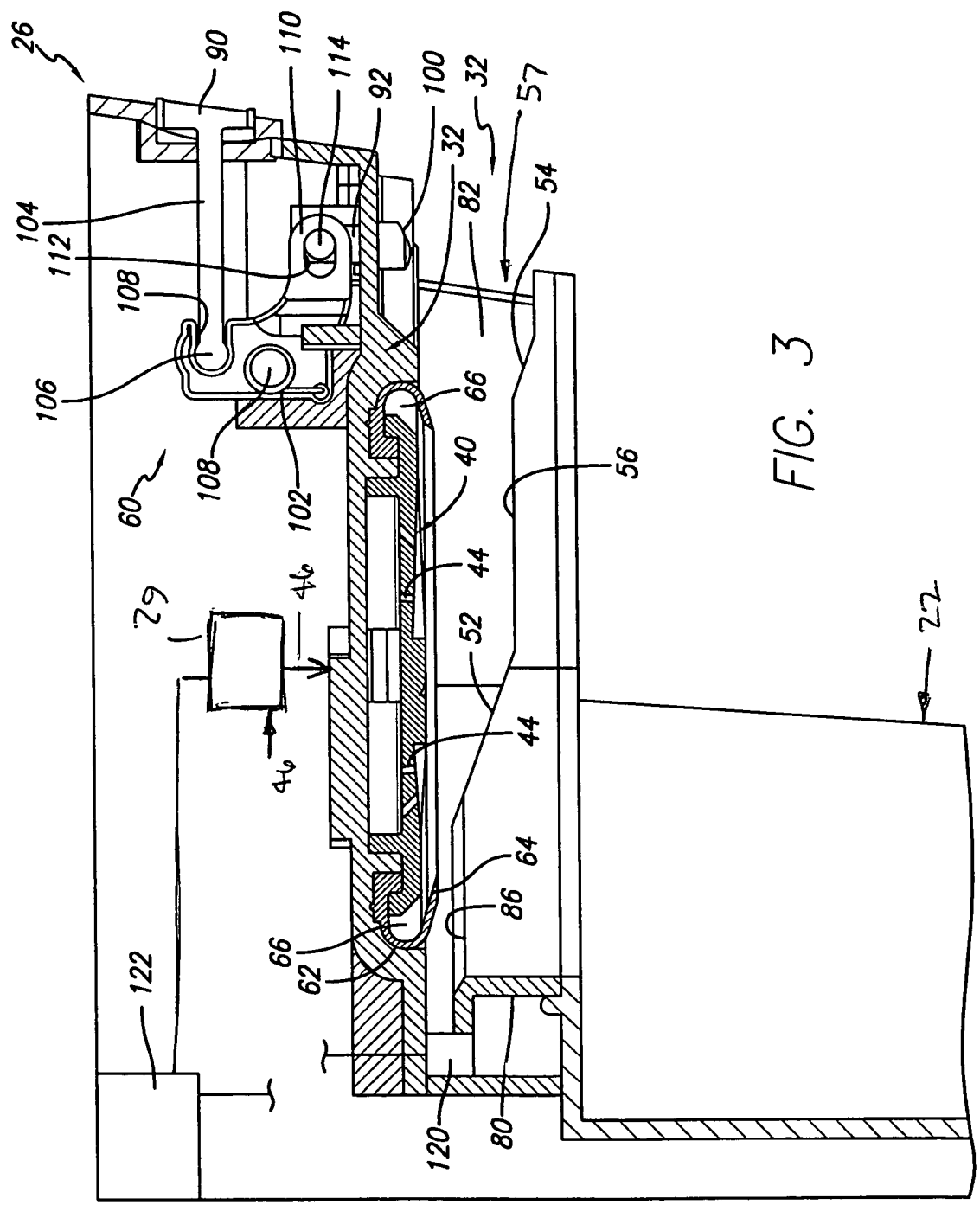
FIG. 3 is a view similar to that as shown in FIG. 2 in which a substance holder has been removed from the brewer.

When the holder 30 is inserted into the upper portion 26 it is engaged with a mounting portion 32 which positions the holder 30 and its contents, the brewing substance in proximity to the sprayhead 40 for brewing. As noted above the structure of the entry opening 38 is symmetric such that corresponding retaining structures 57 are on both sides of the entry opening 38 for supporting the holder 38 by the flanges 53 thereof. With reference to FIGS. 3 and 6, an embodiment of the mounting portion 32 shown includes at least one ramp 52 which cooperates with the corresponding flanges 53 and ramp 55 carried on the holder 30. As shown in FIG. 3, a series of first retaining 54 and second retaining 52 ramps are provided. A flat area 56 is provided between the ramps 52, 54. In this embodiment the retaining structures include the ramps 52, 54 and flat 56. Additionally, the mounting portion 32 may include a release assembly 60 as will be described in greater detail herein below. As noted above, the structure of the entry opening 38 is symmetric such that corresponding retaining structures 57 are on both sides of the entry opening 38 for supporting the holder 38 by the flanges 53 thereof. The holder 30 is similarly symmetric with ramps 55 and flanges 53 on both sides of the holder for engaging corresponding ramps 52, 54 and flat 56 on opposing sides of the opening 38.

The first and second brewer ramps 52, 54 and corresponding holder ramp 55 on the holder 30 are designed to facilitate engagement and disengagement of the holder 30 relative to the upper portion 26 and the sprayhead 40. As previously mentioned, water is delivered from the sprayhead 40 to the holder 30. With this in mind, a gasket 62 or other seal structure is provided generally radially of the sprayhead between the upper portion 26 and the holder 30 to prevent the passage of water from between the structures. This is useful to force or flow all of the water for brewing through the holder 30 and the brewing substance contained in the holder 30.

As shown in FIG. 3, the gasket 62 is a self expanding gasket of known construction. When the holder 30 is positioned in the mounting portion 32 the gasket 62 positions a lip 64 of the gasket against the rim 36 with an annular groove 66 communicating with the cavity 34 to receive brewing water therein and to provide a seal between the holder 30 and an upper surface 39 the upper portion 26. Additionally, as water 46 is dispensed into the cavity 34 pressure inside the holder cavity 34 caused by the flow of heated water into the holder fills an annular recess 66 defined by the gasket 62. The increased pressure in the annular recess increases the sealing function of the lip 64 against the rim 36.

With reference to FIGS. 4 and 5, the holder 30 is configured with a floor 70 positioned in a lower portion of the holder 30 bounded by the wall 33. In one embodiment, one or more spaced apart walls or ribs 72 project upwardly from the floor towards the cavity 34. A support structure 73 is shown in the form of grating 73 or open mesh structure is provided overlying the ribs 72. A variety of embodiments can be configured to support a pod or charge of brewing substance above the drain hole and provide for passage of beverage from the pod through the support structure.

With further reference to FIG. 5, the ribs 72 define large recessed areas 76 between neighboring ribs 72. In fact, the surface area covered by the recesses 76 is significantly greater than the area covered by the ribs 72. The ribs 72 as shown generally support open mesh 73 and the pod positioned thereabove. In another form, the open mesh 73 may be eliminated resulting in the pod being retained on the top edges of the ribs 72 above and not contacting the floor 70. In either of these or other embodiments, the large surface areas facilitate pooling and mixing of the beverage as it drains into the drain 50. The pooling and mixing of the beverage as it is being dispensed facilitates thorough mixing or blending of the flavors prior to dispensing into the cup thereby increasing the uniformity and consistency of the final beverage. Generally, the ribs 72 are narrow structures defining the relatively large open areas 76 to allow drainage of the beverage into the drain hole 74.

The support structure 73 shown in FIGS. 4 and 5 is in the form of open mesh such as woven or non-woven metal or non-metallic strands. Other forms of the mesh or grating and other materials are contemplated by this disclosure. The open mesh 73 is either fixedly attached to the inside surface of the holder extending from the wall or removably attached. If fixed to the inside surface, the grating may be in-molded, ultrasonically welded, friction welded, adhesively attached, mechanically fastener or otherwise attached to the holder. If removably attached, a gasket or retaining ring 75 may be provided to engage the inside surface, a corresponding groove or attached underneath lugs 77. The open mesh defines generally vertically aligned openings further, generally uniformly supporting the pod above the floor 70 of the holder 30. The beverage produced from the pod flows generally vertically through the openings and into the open recesses 76 defined between the neighboring walls 72.

An outlet opening 74 is positioned in a lower portion of the floor 70 to facilitate the draining of liquid from the cavity 34. A pod placed in the cavity 34 will receive water 46 in an upper portion of the pod positioned in close proximity to the entry opening 38. Water flowing through the pod and infusing the substance will drain under some degree of pressure and gravity through the open mesh 73, along to the open areas 76 into a lower portion of the cavity between the ribs 72 and towards the drain 50. Brewed beverage will drain from the pod holder 30 to the drain 50 and out through the outlet opening 74.

Generally, the holder 30 is a container defining the cavity 34 in which a pod can be inserted for preparing coffee or other brewer beverages such as tea. In the holder 30 the bottom or floor 70 drains to the drain 50 with one or more spaces 76 defined between the bottom of a pod and the surface of the floor 70. The support structure 73 is provided to help suspend the pod above the floor 70. The support structure 73 is foraminous or otherwise allows the passage of liquid through it but generally resists the passage of the pod or portions thereof or brewing substance through the openings or passages in the support structure.

In one embodiment this arrangement includes ribs with recesses 76 between neighboring ribs having a lowest point is formed by the floor 70 of the holder 30 providing an open area that drains to the drain 50. However, these recesses 76 are so wide that they define the bottom and are not merely grooves or channels formed in the bottom. The surface area covered by the recesses 76 is generally greater than the surface area covered by the ribs 72. Additional ribs 72 may be added to provide additional, different support or more uniform support. Alternatively, structures other than or in addition to the ribs 72 may be provided underneath the support structure or open mesh 73 or underneath the pod without the use of the mesh.

With reference to FIGS. 2, 3 and 6, the holder 30 is initially positioned with a leading end 80 positioned for insertion into a mouth 82 of the upper portion 26. With reference to FIG. 3, as the leading end 80 is advanced into the mouth 82 it initially encounters a first ramp 54. The first ramp 54 helps to elevate the holder 30 without engaging any surfaces of the holder 30 against the lip 64 of the gasket 62. By not engaging the gasket during the insertion of the holder 30, wear of the gasket 62 can be reduced. Continued advancement of the holder 30 into the mouth 82 results in encountering a flat area 56. The flat area or flat ramp area 56 allows the holder 30 to be advanced inwardly to position the rim 36 in closer linear proximity to the gasket 62. Continued advancement of the holder 30 inwardly into the mouth 32 results in encountering a second ramp 52. The second ramp 52 facilitates upward positioning of the holder 30 in preparation for engaging the gasket 62 with the rim 36 of the holder 30. The upper flat 86 helps to retain the lip 64 of the gasket 62 securely against the rim 36. As will be described in greater detail below, a release assembly or locking assembly 60 helps to retain the holder 30 in the desired position in the mouth 82 to facilitate brewing with the holder 30 and its brewing substance contents.

When the release or lock assembly 60 is disengaged, the holder 30 is allowed to advance outwardly from the mouth 82. As the holder 30 moves from out of the mouth 82 it first encounters the second ramp 52. The generally greater length and slop of the second ramp compared to the first ramp facilitates a rapid disengaging drop of the holder from the gasket. This initial relatively rapid disengagement or drop minimizes the amount of rubbing or scrapping of the holder against the gasket during the disengagement process. The holder descends from engagement proximate to the sprayhead until it reaches the generally flat area 56 or interface between the two slopped areas. In this position, the user can decide to further disengage the holder or maintain the holder in the position for other purposes such as preparing a new pod for brewing. When desired, the user can continue to extract the holder from the mouth 32, remove the spent pod and insert a new pod.

As mentioned above, in at least one embodiment a locking and release assembly 60 is provided. The assembly includes a release button or mechanism 90 a pin 92 which is selectively engageable with the holder 30 and a linkage 94 coupled to the release button 90 and the pin 92. In this configuration, operation of the release button 90 causes operation of the linkage 94 further operating on the pin 92. Operation of the button therefore causes operation of the pin to release the pin from the holder 30.

With reference to FIGS. 2, 4 and 5 the pod holder includes a pin ramp 96 and a pin cavity 98. As the pod holder 30 is advanced into the mouth 82 one of the final operations during the final stroke of the holder 30 into the mouth 82 is for a leading edge 100 of the pin 92 to ride up on the pin ramp 96. When the pin cavity 98 is encountered the pin 92 drops into the cavity 98 thereby causing engagement of the locking assembly 60 with the pod holder 30.

The locking mechanism 60 includes a biasing device such as a spring 102 to positively bias the pin 92 in a down or cavity engaging position. By using the biasing device 102 the pin will positively engage and retain the cavity 98 by default. Operation of the button 90 is used to overcome the biasing force of the spring 102. The button 90 includes an arm 104 with a head 106 engaging a socket 108 of the linkage. The linkage 94 is carried on a post 108 to facilitate pivoting movement of the linkage. A second end 110 of the linkage 60 includes a loss motion slot 112 for engagement with a pin post 114. Inward depression of the button 90 imposes force through the arm 104 to the head 106 engaged in the socket 108. The curved surfaces of the head and socket 106, 108 facilitate some degree of pivoting or sliding movement between these components to promote pivotal rotation of the linkage 60 about the post 108. When a sufficient force is imposed on the button to overcome the positive biasing force of the spring 102 the linkage is slightly rotated to lift upwardly on the pin by means of the pin posts 114 engaged in the lost motion opening 112.

The button 90 is conveniently positioned above a front edge 116 of the pod holder 30. An underlying portion of the pod holder 30 includes a hand grip 118. The grip 118 is positioned relative to the button 90 to facilitate a single hand operation of the pod holder 30. In other words, multiple hands are not needed in order to open the pod holder and return the pod holder to the brewer.

A sensor 120 is provided coupled to a controller 122. The sensor 120 is generally carried on the brewer. The sensor is coupled to a brewer controller 122 and operates to detect the engagement of the pod holder 30 in the mouth 82. As illustrated, the sensor 120 is positioned in the back of the mouth. Other locations are anticipated and fully included within the scope of this disclosure. In one embodiment, the sensor 120 is a contact switch. The controller 122 is also coupled to the water delivery system 29 for selectively monitoring and controlling the water delivery system 29.

Examples of the use of the sensor 120 include locking out the brewer to prevent brewing unless brewing is actually desired. In use, if the user selects the brew button 126 to activate the brewer shown generally in this embodiment on the base 24. If the sensor 120 in the form of a switch is open the system will control the water delivery system 29 to lock out and prevent dispensing of water. Additional indicia such as a visual, audio or any other form of sensory feedback can be provided so as to indicate that a pod must be inserted into the holder 30. If the user attempts to remove the holder 30 during a brew cycle the brew cycle will be stopped by operation of the controller ceasing to dispense water 46. Additionally, if at the end of a brewing cycle the sensor 120 does not sense the removal of the holder the system is locked out. In other words, in this condition the machine is asking for a fresh pod.

Figure 7:
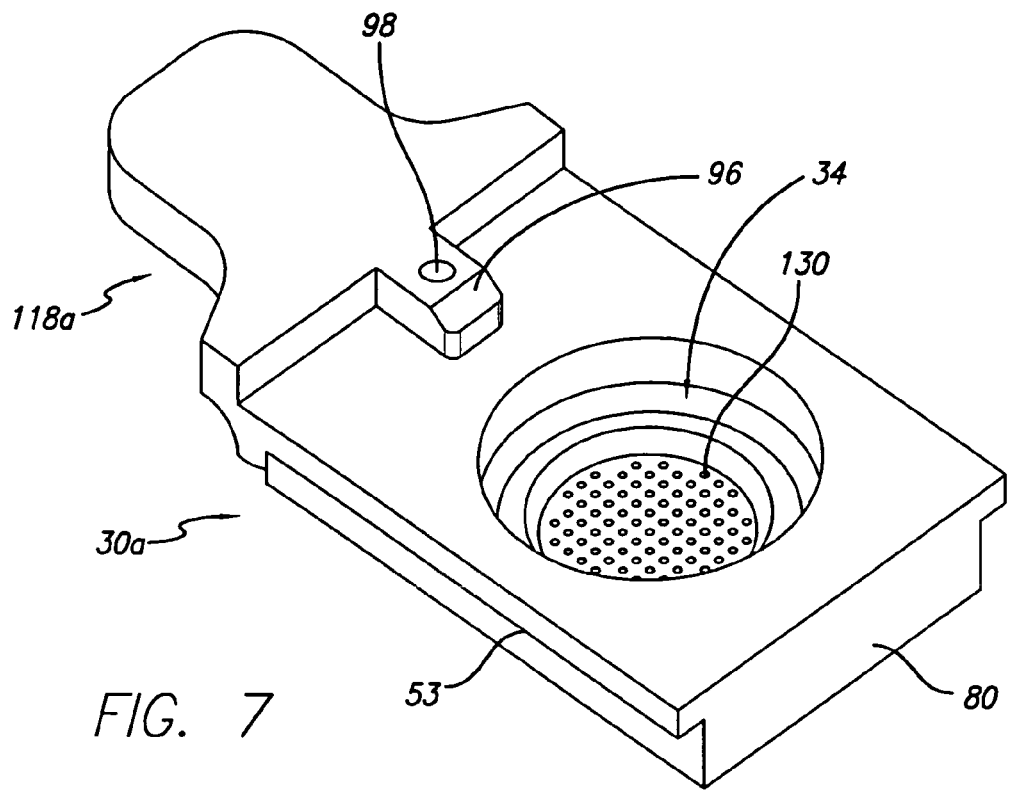
FIG. 7 is a top perspective view of another form of the substance holder.
Figure 8:
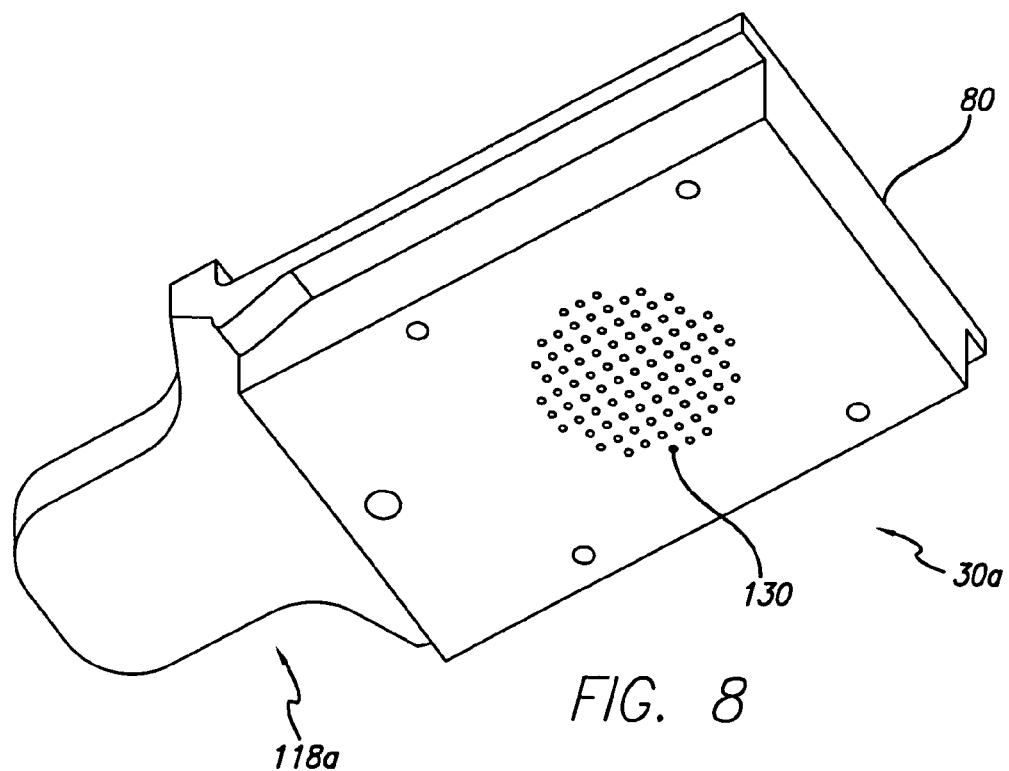
FIG. 8 is a bottom perspective view of the substance holder as shown in FIG. 7.
Figure 9:
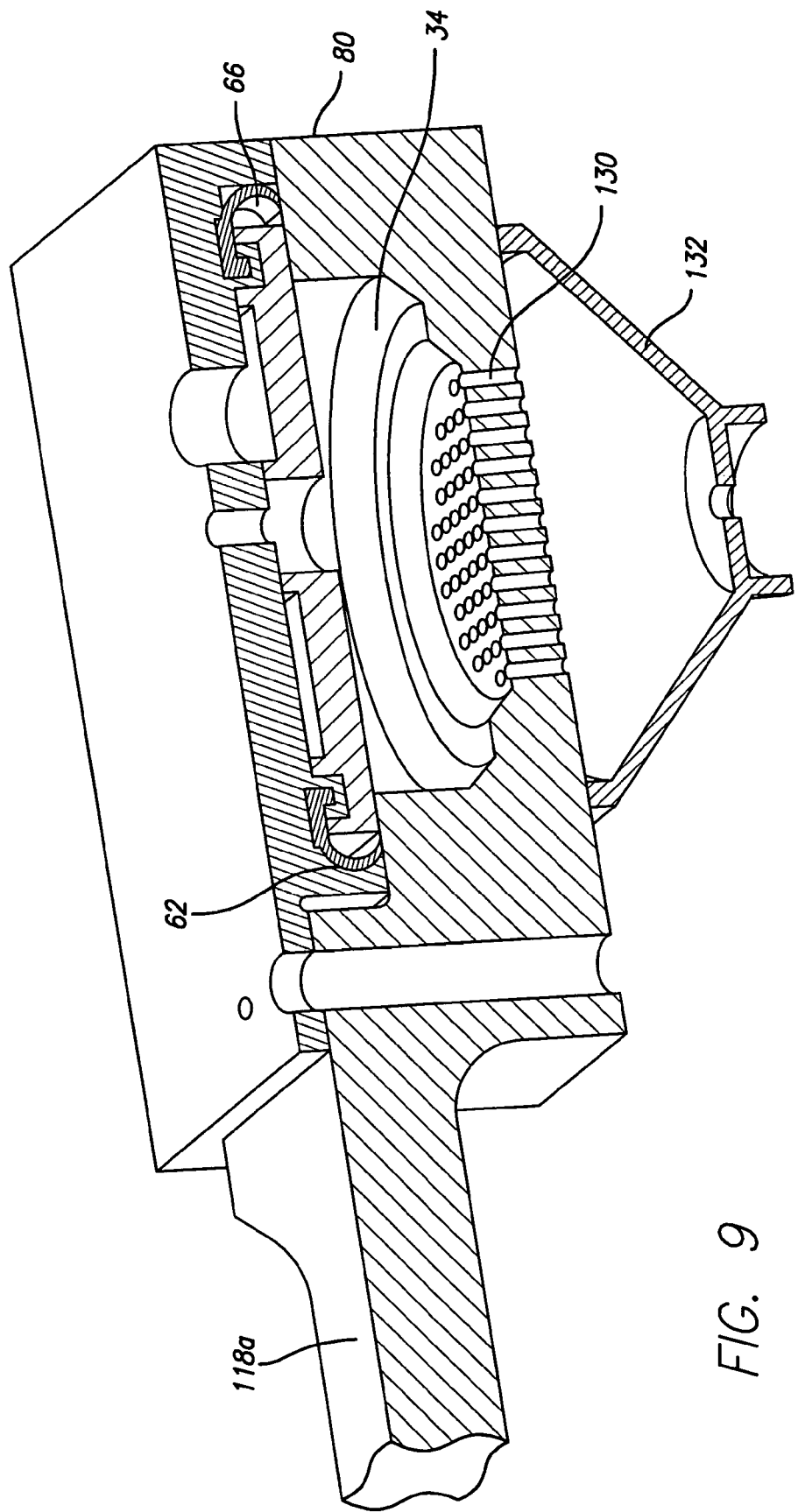
FIG. 9 is a partial fragmentary cross-sectional view of the substance holder as show in FIGS. 7 and 8 including a funnel attached thereto.
Figure 10:
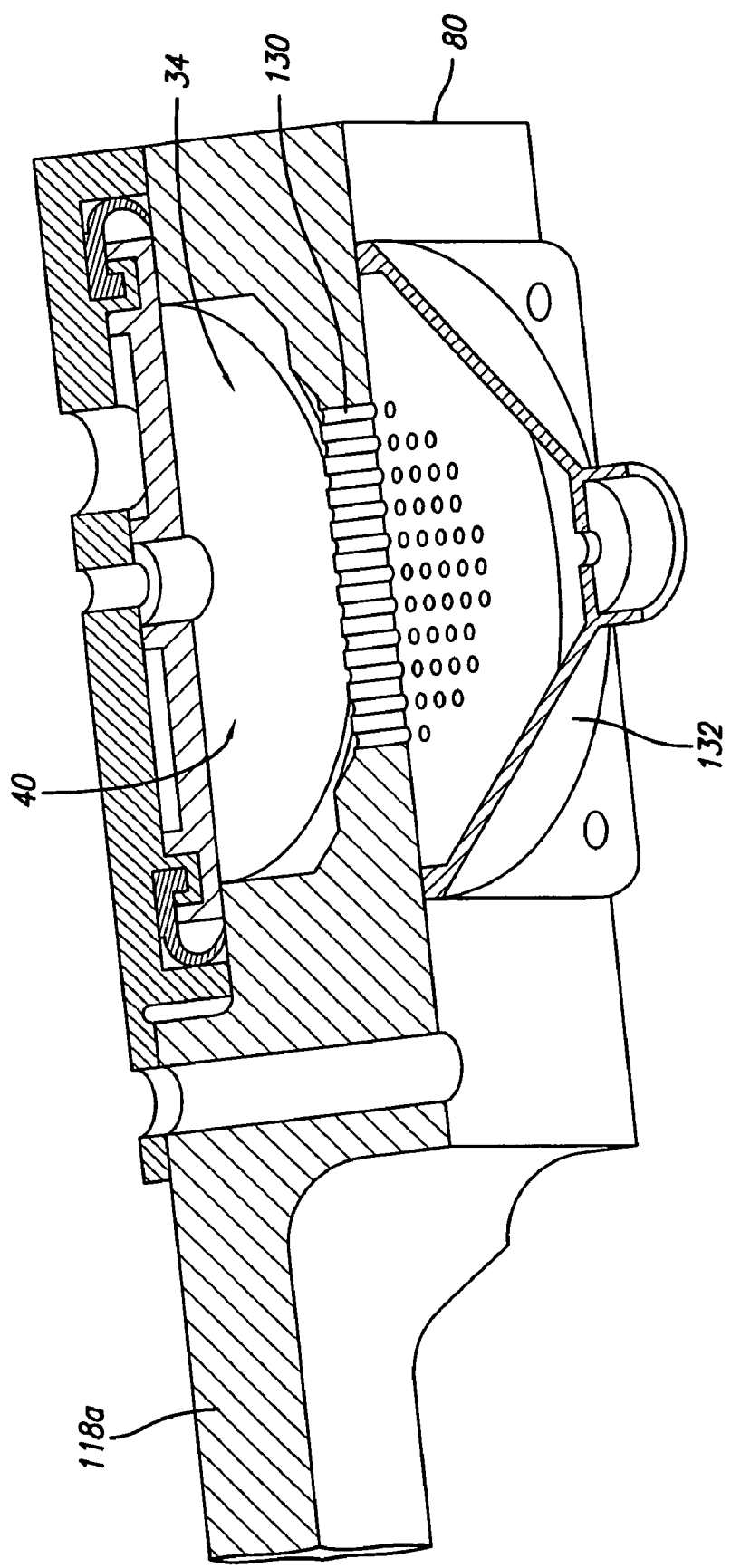
FIG. 10 is bottom view of the cross-section as show in FIG. 9.

FIGS. 7-10 show another form of the pod holder 30a. In this embodiment generally vertically aligned openings 130, generally analogous to the mesh openings described above are provided in the pod holder 30a. FIG. 7 shows a top perspective view while FIG. 8 shows a bottom perspective view. FIGS. 9 and 10 show partial fragmentary cross sectional view of the holder engaged with a brewer and also including a funnel structure 132 attached to a bottom side of the holder. The funnel collects and blends the beverage draining through the openings of the holder. The funnel may be configured for removal and cleaning.

The structure of the brewer 20 includes the body 22 having the upper portion 26 defining a mounting portion 32. The mounting portion 32 defines the entry opening 38 with retaining structures 57 positioned on generally opposite sides of entry opening 38. The holder 30 is constructed with corresponding retaining structures in the form of flanges 53 and ramps 55 for cooperatively engaging corresponding ramps 54, 52 and flat 56 on the corresponding sides of the entry opening 38.

The holder 30 is removed from the mounting portion 32 by pressing the button 90 which operates the release assembly 60. Disengagement of the pin 92 from the cavity 98 allows the holder 30 to be removed from the brewer. Disengagement of the release assembly 60 allows the holder 30 to slide downwardly away from the sprayhead 40 to disengage the 62 from the holder. The downward movement occurs as a result of ramp 55 of the holder 30 sliding along corresponding ramp 52 of the brewer. When the flange 53 of the holder 30 contacts flat 56, the holder 30 may be suspended in this position. The user can grip the front edge 116 and the corresponding open area 119 in the hand grip 118 to remove the holder 30 from the brewer.

When the holder 30 is removed from the brewer it can be placed on a flat surface such as a counter top without tipping over. Legs 121 are provided extending downwardly from the holder 30 to provide leveling support of the holder. Additionally, the legs can be sized in dimension to suspend the nozzle 74 off the corresponding surface to prevent contamination, dripping or other beneficial features. Additionally this allows the user to remove the pod 123 from the cavity 34 without having to hold the holder 30. The legs 121 also allow the holder to be stored in a convenient location without tipping over. The legs 121 are sized and dimensioned so as to not interfere with the operation of the holder in the brewer. While three legs 121 are shown in the illustrations, fewer or more legs may be used as well as an entire single leg forming a wall or other structure to provide the leveling characteristics as shown and described herein.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods that incorporate one or more of the features of the disclosure and fall within the spirit and scope of the present disclosure.

The invention claimed is:

1. A beverage brewer comprising: a body; a water delivery system operatively associated with the brewer for delivering water for brewing; a base positioned at a lower portion of the body; an upper portion of the body positioned generally above the base; a holder; a wall of the holder defining a cavity for receiving brewing substance, the cavity being selectively positionable in communication with the water delivery system for receiving brewing water; at least one drain in the holder for draining liquid from the cavity; at least one flange extending from the holder; at least one holder ramp extending from the holder; retaining structures on the upper portion of the body for receiving the flange and ramp of the holder and retaining the holder above the base; a pair of flanges positioned on generally opposite sides of the holder; a pair of holder ramps positioned on the holder generally between a front edge of the holder and the flange; a first pair of retaining ramps on the retaining structures, the first pair of retaining ramps being generally spaced apart on opposite sides of the upper portion for receiving the holder there between, the first pair of retaining ramps cooperatively engaging the corresponding holder ramps; and a second pair of retaining ramps on the retaining structures, the second pair of ramps being positioned generally inwardly of the first pair of ramps, the first and second pairs of ramps being generally spaced apart on opposite sides of the upper portion for receiving the holder there between, the first pair of ramps cooperatively engaging the corresponding holder ramps and the second pair of ramps raising the holder for engagement with a portion of the water delivery system.

2. The beverage brewer of claim 1 further comprising: the holder sliding generally linearly into and out of engagement with the upper portion with the at least one flange and at least one ramp engaging corresponding retaining structures on the upper portion, the ramp engaging the retaining structures as the holder is moved into the upper portion to move the holder generally upwardly to engage the holder with a portion of the water delivery system.

3. The beverage brewer of claim 1 further comprising: a sprayhead communicating with the water delivery system for distributing water to a brewing substance retained in the holder, the holder positioning the brewing substance in close proximity to the sprayhead.

4. The beverage brewer of claim 3 further comprising: a gasket carried on the upper portion generally radially of the sprayhead, the gasket engaging an upper surface of the holder for sealing the brewer and holder against leakage of water during brewing.

5. The beverage brewer of claim 4 further comprising: the gasket being an expandable gasket having an annular groove communicating with the cavity for receiving brewing water therein to facilitate sealing of the holder on the brewer.

6. The beverage brewer of claim 1 further comprising: a floor positioned in the lower portion of the holder cavity bounded by the wall, a support structure retained against the wall and spaced above the floor.

7. The beverage brewer of claim 6, the support structure further comprising a foraminous material.

8. The beverage brewer of claim 1 further comprising: a floor positioned in the lower portion of the holder cavity bounded by the wall, a support structure extending from the wall and spaced above the floor.

9. The beverage brewer of claim 8, the foraminous material support structure further comprising at least one of woven material, non-woven material, molded material and formed material.

10. The beverage brewer of claim 1 further comprising: a floor positioned in the lower portion of the holder cavity bounded by the wall, at least one rib projecting upwardly from the floor, a support structure retained in the cavity overlying the at least one rib.

11. The beverage brewer of claim 1 further comprising: a quantity of brewing substance in the form of a pod being used with the brewer, the pod having at least one layer of water permeable material covering a brewing substance.

12. The beverage brewer of claim 1 further comprising: a control assembly for controlling operation of the brewer.

13. The beverage brewer of claim 1 further comprising: a sensor carried on the brewer and coupled to the controller, the sensor positioned for detecting at least one of the presence and absence of the holder in relation to the upper portion.

14. The beverage brewer of claim 1 further comprising: the water delivery system being coupled to the controller for selectively controlling the water delivery system.

15. The beverage brewer of claim 1 further comprising: a sensor carried on the brewer and coupled to the controller, the sensor positioned for detecting at least one of the presence and absence of the holder in relation to the upper portion; and the water delivery system being coupled to the controller for selectively controlling the water delivery system in response to the presence or absence of the holder.

16. The beverage brewer of claim 1 further comprising: a grip defined on the holder generally along a front edge thereof for gripping the holder when removing it from the brewer.

17. The beverage brewer of claim 1 further comprising: a release assembly carried on the upper portion of the brewer for releasably engaging the holder on the upper portion.

18. The beverage brewer of claim 17 the release assembly further comprising a release button for operatively actuating the release assembly, the release button being located on the front of the upper portion above the holder.

19. The beverage brewer of claim 1 further comprising: a release assembly carried on the upper portion of the brewer for releasably engaging the holder on the upper portion; a release button of the release assembly for operatively actuating the release assembly; the holder defining a grip generally along a front edge thereof for gripping the holder when removing it from the brewer; and the release button being located on the front of the upper portion above the grip of the holder.

20. In a beverage brewer for use with a beverage brewing pod, the beverage brewer having a body with a base and an upper portion positioned generally above the base, a pod holder for receiving a pod, a pressurized water delivery system with a fixed position spray head for providing pressurized water to the pod holder for brewing, a retaining structure on the upper portion for receiving the pod holder in a generally linear orientation and retaining the pod holder in communication with the water delivery system, the pod holder comprising:
  a wall defining a cavity for receiving a pod, the cavity being positionable in communication with the water delivery system for receiving brewing water from the spray head;
  a drain in the holder for draining liquid from the cavity;
  at least one flange extending from the holder;
  at least one ramp extending from the holder;
  the ramp and flange being engagable with the retaining structure for retaining the pod holder on the brewer with the ramp extending from the holder engaging the retaining structure to provide a degree of vertical movement of the holder when engaged in a generally continuous, non-rotary linear orientation with the brewer for positioning the spray head in proximity with the cavity.

21. A beverage brewer comprising: a body; a water delivery system operatively associated with the brewer for delivering water for brewing; a base positioned at a lower portion of the body; an upper portion of the body positioned generally above the base; a holder for containing a quantity of brewing substance; a wall of the holder defining a cavity for receiving a quantity of brewing substance, the cavity being in communication with the water delivery system for receiving brewing water; at least one drain in the holder for draining liquid from the cavity; at least one flange extending from the holder; at least one holder ramp extending from the holder; retaining structures on the upper portion of the body for receiving the flange and ramp of the holder and retaining holder above the base; a pair of flanges positioned on generally opposite sides of the holder; a pair of holder ramps positioned on the holder generally between a front edge of the holder and the flange; a first pair of ramps on the retaining structure; a second pair of ramps on the retaining structure generally inwardly of the first pair of ramps, the first and second pairs of retaining ramps being generally spaced apart on opposite sides of the upper portion for receiving the holder there between, the first pair of ramps cooperatively engaging the corresponding holder ramps and the second pair of retainer ramps raising the holder for engagement with a portion of the water delivery system; and the holder sliding generally linearly into and out of engagement with the upper portion.

22. A beverage brewer comprising:
a body;
a pressurized water delivery system with a fixed position spray head operatively associated with the brewer for delivering pressurized water for brewing;
a base positioned at a lower portion of the body;
an upper portion of the body positioned generally above the base;
a holder;
a wall of the holder defining a cavity for receiving brewing substance, the cavity being selectively positionable in communication with the water delivery system for receiving pressurized brewing water;
at least one drain in the holder for draining liquid from the cavity;
at least one flange extending from the holder;
at least one holder ramp extending from the holder;
retaining structures on upper portion for receiving the flange and ramp of the holder in a generally linear orientation and retaining the holder above the base, the ramps being selectively engageable in a generally linear orientation without rotation for providing a degree of vertical movement of the holder to raise the holder into communication with the fixed position spray head; and
at least one leg extending from the holder for retaining the holder in an upright position when removed from the brewer and placed on a surface.

23. A method of brewing a beverage comprising:
providing a brewer;
providing a pressurized water delivery system with a fixed spray head operatively associated with the brewer for delivering pressurized water for brewing;
providing a retaining structures on the brewer having at least one ramp thereon;
providing a holder for containing a brewing substance, the holder having at least one flange extending from the holder and at least one holder ramp extending from the holder;
placing brewing substance in the holder;
engaging the holder with the retaining structures;
generally continuously linearly sliding the holder into the brewer without rotation for positioning the brewing substance in proximity relative to the fixed spray head of the pressurized water distribution assembly; and
continuing to linearly slide the holder into engagement with the brewer to cause the ramp on the retaining structures to engage the ramp on the holder for providing a degree of vertical movement of the holder to raise the holder into communication with the fixed spray head of the pressurized water delivery system.

24. A method of brewing a beverage comprising: providing a brewer; providing a water delivery system operatively associated with the brewer for delivering water for brewing; providing a retaining structures on the brewer having at least one ramp thereon; providing a holder for containing a quantity of brewing substance, the holder having at least one flange extending from the holder and at least one holder ramp extending from the holder; placing a quantity of brewing substance in the holder; engaging the holder with the retaining structures; generally linearly sliding the holder into the brewer for positioning the brewing substance in proximity relative to the water distribution assembly; continuing to slide the holder into engagement with the brewer to cause the ramp on the retaining structures to engage the ramp on the holder for raising the holder into communication with the water delivery system; providing a pair of flanges positioned on generally opposite sides of the holder; providing a pair of holder ramps positioned on the holder generally between a front edge of the holder and the flange; providing a first pair of ramps on the retaining structure; providing a second pair of ramps on the retaining structure generally inwardly of the first pair of ramps, the first and second pairs of retaining ramps being generally spaced apart on opposite sides of the upper portion for receiving the holder there between; cooperatively engaging the first pair of ramps and the corresponding holder ramps and the second pair of retainer ramps; and continuing engagement of the ramps to cause the holder to rise and engage against a portion of the water delivery system.

25. The method of brewing a beverage of claim 24 further comprising: providing a pod of brewing substance; and placing the pod in the holder for brewing.

* * * * *